US008874400B2

(12) United States Patent
Manfredi (10) Patent No.: US 8,874,400 B2
(45) Date of Patent: *Oct. 28, 2014

(54) INTEGRATED TOOL FOR COMPLIANCE TESTING WITHIN AN ENTERPRISE CONTENT MANAGEMENT SYSTEM

(75) Inventor: Charles Manfredi, Oakhurst, NJ (US)

(73) Assignee: Agilent Technologies, Inc., Santa Clara, CA (US)

( * ) Notice: Subject to any disclaimer, the term of this patent is extended or adjusted under 35 U.S.C. 154(b) by 613 days.

This patent is subject to a terminal disclaimer.

(21) Appl. No.: 12/150,030

(22) Filed: Apr. 24, 2008

(65) Prior Publication Data

US 2008/0201098 A1    Aug. 21, 2008

Related U.S. Application Data

(63) Continuation of application No. 11/119,255, filed on Apr. 29, 2005, now Pat. No. 7,440,863.

(51) Int. Cl.
  *G01D 3/00* (2006.01)
  *G21C 17/00* (2006.01)
  *G06F 11/36* (2006.01)
  *G06F 11/34* (2006.01)
  *H04L 12/26* (2006.01)

(52) U.S. Cl.
  CPC ........ *G06F 11/3672* (2013.01); *G06F 11/3409* (2013.01); *G06F 11/3668* (2013.01); *H04L 12/2697* (2013.01); *H04L 43/06* (2013.01); *H04L 43/50* (2013.01)
  USPC .......................................... 702/108; 702/182

(58) Field of Classification Search
  USPC ........... 702/81, 108, 115, 117, 118, 182, 189; 703/21, 22; 700/108–110
  IPC ...................................... G06F 11/3409,11/3668
  See application file for complete search history.

(56) References Cited

U.S. PATENT DOCUMENTS

| | | | | |
|---|---|---|---|---|
| 5,280,617 A | * | 1/1994 | Brender et al. | 717/159 |
| 5,841,771 A | | 11/1998 | Irwin et al. | |
| 5,878,383 A | * | 3/1999 | Carter | 702/182 |
| 5,961,448 A | | 10/1999 | Swenson et al. | |
| 6,054,865 A | * | 4/2000 | Bald et al. | 324/551 |
| 6,456,955 B1 | | 9/2002 | Andrews et al. | |
| 6,876,941 B2 | * | 4/2005 | Nightingale | 702/120 |
| 6,978,218 B1 | * | 12/2005 | Kolb et al. | 702/122 |
| 7,440,863 B2 | * | 10/2008 | Manfredi | 702/108 |
| 7,890,285 B2 | * | 2/2011 | Manfredi | 702/120 |

(Continued)

OTHER PUBLICATIONS

Webopedia, "metadata", 2 pgs, 2007.

(Continued)

*Primary Examiner* — Michael Nghiem (57) ABSTRACT

Methods, tools, systems and computer readable media for compliance testing instrumentation and/or software. Data from one or more analytical instruments and/or software is converted to a technology-neutral format, which is independent of instrument type, instrument model, instrument manufacturer and data type of the analytical instrument or software from which the data was outputted. Calculations are performed on the converted data to produce one or more outputs, and then selection is made from the one or more outputs to populate a final report, wherein the one or more outputs are standardized and are directly comparable to outputs resultant from carrying out the method on another set of one or more other analytical instruments and/or software, irrespective of manufacturer or model of the other analytical instruments and/or software.

22 Claims, 7 Drawing Sheets

(56) References Cited

U.S. PATENT DOCUMENTS

| | | | |
|---|---|---|---|
| 2002/0156757 A1 | 10/2002 | Brown | |
| 2002/0183956 A1 | 12/2002 | Nightingale | |
| 2002/0192624 A1* | 12/2002 | Darby et al. | 434/236 |
| 2003/0008648 A1* | 1/2003 | Bims et al. | 455/423 |
| 2003/0084340 A1 | 5/2003 | Schertz et al. | |
| 2004/0006403 A1* | 1/2004 | Bognanno | 700/109 |
| 2004/0109453 A1 | 6/2004 | Wirth | |
| 2004/0128646 A1 | 7/2004 | Jindal et al. | |
| 2004/0145598 A1 | 7/2004 | Parent et al. | |
| 2005/0022087 A1* | 1/2005 | Pramanick et al. | 714/742 |
| 2005/0071720 A1* | 3/2005 | Dattaram Kadkade et al. | 714/741 |
| 2006/0041840 A1 | 2/2006 | Blair et al. | |
| 2006/0077895 A1 | 4/2006 | Wright | |
| 2006/0155411 A1* | 7/2006 | Khoche et al. | 700/108 |
| 2006/0161836 A1 | 7/2006 | Thomson | |
| 2006/0247878 A1 | 11/2006 | Mandredi | |
| 2006/0247885 A1* | 11/2006 | Manfredi | 702/120 |
| 2008/0059123 A1 | 3/2008 | Estberg et al. | |
| 2008/0201098 A1 | 8/2008 | Manfredi | |
| 2008/0215638 A1* | 9/2008 | Manfredi | 707/203 |
| 2010/0030718 A1* | 2/2010 | Anderson et al. | 706/47 |

OTHER PUBLICATIONS

IEEE Xplore, "standardization of data ow for laboratory automation soft on XML technology", 2 pgs., 2006.

Office action dated Jul. 16, 2009, in U.S. Appl. No. 11/286,198.

AGILENT—Cerity Pharmaceutical for QA/AC. http://www.chem.agilent.com/Scripts.PDS.asp!|Page=272 pp. 2. Mar. 3, 2005.

Waters Laboratory Informatics—Empower TM Chromatography Data Software. http//www.waters.com/watersdivision/contentd.asp?watersit=JDRS-5KXPGA pp. 2. Feb. 18, 2005.

SSI—Chromatography Data System http://www.scisw.com/products/cds/index2.htm pp. 2. Mar. 3, 2005.

AGILENT—Cerity Enterprise Content Manager (ECM) http://www.chem.agilent.com/Scripts/PDS.asp?|Page=16769 pp. 1-2. Feb. 19, 2005.

AniML—Analytical Information Markup Language. http://animl.sourceforge.net/ pp. 1-8. Feb. 19, 2005.

Microsoft Office Online: Visio 2003 Home Page http://office.microsoft.com/en-us/FX010857981033.aspx pp. 1-2. Apr. 28, 2005.

FormMax—E-Forms Software forBusiness Forms Designing and Filli . . . http://www.cutepdf.com/Products/FormsMax/ pp. 1-2. Feb. 18, 2005.

Revision of ChemStations Plus—Agilent Technologies http://www.laboratorytalk.com/news/agi//agi134.html pp. 2. Jan. 15, 2002.

* cited by examiner

Instrument Name: |Charlie's Instrument|

Other Name:

```
11B O abj<</size 119/ROOT 1 0 R/ID[<B960B8315a5747479ac05a8440ok005e><136c5bfb974a3d4989061daO    727a8>]/Length
11/Filter/FlateDecode/DecodeParms<</Columns 4/Predictor 12>>/w[130]/Type/XRef/INfor 3 0 R/Index[118]>>stream
xobodzid:o A o|o...
endstrean1endobj01  0 ab1cc/Pages 2 O R/Type/Catalog/Names BB O R/AcroFarmcc/Fields[17 O R]/DRcc/Font  /Helv 47 D R/ZaDb
L15 0 R/Myriac|PFD-Regular 50 D R>>>>/DAC/Melv 0 TT D g >/XFA[(xdp:xdp)90 D R(config)92 0 R(tenplac )94 D R(datasets) 96 D
s(localeSet)98 O R(/xdp:xdp)100 D R]>>/StructTreeRoot B D R/Metadata 117 C R/MarkIrfocc/Marked true>> >Dendabj13 0
obj<</MOdDate(0:2004LD15151651-04'00')/creationDate(D:20041D15151544-04'00')/creator(Adobe Designer 6.0)/producer(Adobe
Designer 0.0)lendogj049 0 objcc/F4/Type/Annot/Parent 58 D R/Rect[211.352005 427/323029 Z97KIB5D2B
137.414032]/FT/TX/subtype/Midget/P 9 0 R/T(by |Instrument_Name_[0]0/v9Charlie's Instrument]/ AF4</T0 116 0
R>>/StructParett I/Q D/DAT/NyriadPro-Regular 10.00 TUfText
Field)/MK<<>>/TTA(form1(0). fsubform[0]. Instrument_name[DJ])>>openobja114 O|obj nulloendabja115 0
obj>>/Type/Font/Name/ZaDb/BaseFont/ZaptDingbat s/Subtype/Type1>>Dendabj0118|0 obj<</Length 11B/Type/xObject/BBox[0. 0  0. 0
85.833023 10.091003]/Resources<</Font<</MyriadPro-Regular 50 0 R>>/procset[/PDF/text]>>/subtype/FDRM/FORMTYPE 1/Matrix[1.0
O. D  0.0 1.0 0.0 0.0]>>stream
MTX DMC0qu1 1 83.833 8.0B1 reownoBT 0/MyriaD|PFD-Regular 10 Tfu2 1.8905 TOD|1.31 TLO(charlie's instrument) TjOETOQIEWCD
```

INTEGRATED TOOL FOR COMPLIANCE TESTING WITHIN AN ENTERPRISE CONTENT MANAGEMENT SYSTEM

This application is a continuation of application Ser. No. 11/119,255, filed Apr. 29, 2005 and titled "Integrated Tool for Compliance Testing Within an Enterprise Content Management System", now U.S. Pat. No. 7,440,863, which is incorporated herein, in its entirety, by reference thereto, and to which application we claim priority under 35 USC §120.

BACKGROUND OF THE INVENTION

Qualification of instruments for regulated markets has traditionally followed one of two models: paper-based protocols that are run on instruments using the native controllers of the respective instruments; and external calculations or qualification routines that are embedded into the controlling softwares of the instruments, respectively. Some efforts at automated data collection have required that an alternative data path be employed for the data collection while still controlling the instrument using its native controller. Examples of proprietary embedded software suites include Cerity NDS (Agilent Technologies, Inc.) for chemical/pharmaceutical quality assurance and quality control, and Empower CDS (based on Waters Millenium software, Waters, Inc.). These software suites are limited to the suite of instruments that they can control.

Thus, even though these suites are proficient for producing data and results for qualification/quality assurance tasks for the particular instruments that they control, such suites cannot provide standardization of the data types that are processed, nor calculations across controller platforms. Further, data is maintained in a proprietary format that requires the collecting data system to be present and functioning for viewing and reprocessing any data used/outputted by these systems.

Recently, an integrated single source of data collection and storage, EZChrom Elite, was introduced by Scientific Software, Inc. While offering a relatively large driver set, this solution is still limited by the available drivers that are provided with the solution.

Further, all of the current solutions, including those mentioned above, as applied to instrument qualification, require decoupling of the native system that controls the instrument to be qualified, in one fashion or another.

It would be desirable to provide a solution capable of incorporating data from different instruments, as well as from different manufacturers, to compile reports thereon. It would be further desirable that such a solution provides standardization among various data types so that one platform can be readily used to generate reports using data generated from instrument having different platforms, and/or still other instruments that aren't included with any established platforms. Accordingly, there is a need for solutions that are generally applicable for use with data generated/collected by instruments from most, if not all manufacturers, to readily prepare reports therefrom and/or otherwise manipulate the data as needed

SUMMARY OF THE INVENTION

Methods, tools, systems and computer readable media for compliance testing of analytical information are provided. Data outputted from at least one analytical instrument and/or software may be converted to a technology-neutral, format, which is independent of instrument type, instrument model, instrument manufacturer and data type of the analytical instrument from which the data was outputted. One or more calculations are then carried out on the converted data to produce one or more outputs, and selection from the one or more outputs is made to populate a final report. The one or more outputs are standardized and are directly comparable to outputs resultant from the method being carried out on data from another set of one or more other analytical instruments, irrespective of manufacturer or model of the other analytical instruments.

Systems, tools, methods and computer readable media are provided for standardizing characterizations of at least one of analytical hardware and controlling software during compliance testing. Algorithms are provided for converting data from a native format as outputted by an analytical or other instrument to a technology-neutral format. A data reduction engine is configured to reduce the data to a technology-independent, reduced metadata set. A calculation engine is configured to perform at least one calculation on at least one of the data converted to a technology-neutral, standardized format and the reduced metadata set to produce one or more outputs required for a set of predefined criteria.

Systems, tools, methods and computer readable media are provided for compliance testing at least one of instrumentation and software, including: displaying a test protocol on a user interface and prompting a user to input information regarding results of a test; prompting at least one instrument or software associated with an instrument to initiate the test protocol in response to an input by the user into the test protocol displayed on the user interface, or results from another instrument in response to a test protocol run on the another instrument; and automatically calculating results of the test protocol run on the at least one instrument.

These and other advantages and features of the invention will become apparent to those persons skilled in the art upon reading the details of the system, tools, methods and computer readable media as more fully described below.

BRIEF DESCRIPTION OF THE DRAWINGS

FIG. 5 illustrates an extraction of information from a form.

DETAILED DESCRIPTION OF THE INVENTION

Before the present systems, methods and computer readable media are described, it is to be understood that this invention is not limited to particular hardware, software, or media described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed within the invention. The upper and lower limits of these smaller ranges may independently be included or excluded in the range, and each range where either, neither or both limits are included in the smaller ranges is also encompassed within the invention, subject to any specifically excluded limit in the stated range. Where the slated range includes one or both of the limits, ranges excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, the preferred methods and materials are now described. All publications mentioned herein are incorporated herein by reference to disclose and describe the methods and/or materials in connection with which the publications are cited.

It must be noted that as used herein and in the appended claims, the singular forms "a", "and", and "the" include plural referents unless the context clearly dictates otherwise. Thus, for example, reference to "a form" includes a plurality of such forms and reference to "the analytical instrument" includes reference to one or more analytical instruments and equivalents thereof known to those skilled in the art, and so forth.

The publications discussed herein are provided solely for their disclosure prior to the filing date of the present application. Nothing herein is to be construed as an admission that the present invention is not entitled to antedate such publication by virtue of prior invention. Further, the dates of publication provided may be different from the actual publication dates which may need to be independently confirmed.

Definitions

A "platform" as used herein refers to a support infrastructure for acceptance and coordination of tools and applications required to perform a series of related, but diverse tasks.

An "enterprise content manager" refers to a system, scalable to enterprise levels, composed of various hardware and software elements that support the secure collection, indexing and storage of electronic objects.

Disclosed herein are methods, systems and computer readable media for processing data outputted by analytical instruments in a standardized manner so that results of processing are directly comparable with results from processing data outputted by other instruments, regardless of model or manufacturer. Methods, tools and computer readable media for generating, transmitting and storing forms specific for a user's needs are provided, including, but not limited to compliance validation forms. Systems include computers and associated hardware that may be connectable to a network (for internet or intranet use) that can execute rules for a selected form (e.g., one non-limiting example is a form suitable for submission to a regulatory agency such as the FDA). In one embodiment, a system is provided to perform analytical hardware qualifications.

Calculations may be performed to answer a series of questions relating to one or more performance tests designed to determine compliance of an analytical instrument and/or software under consideration with a set of predefined criteria. Such predefined criteria may be criteria defined for regulated industries. For example, "predefined criteria" include, but are not limited to regulations set forth in the Food, Drug, and Cosmetic Act. Predefined criteria are limits and criteria that represent best practices and manufacturers' specifications relating to instrument operation and performance. Compliance to these acceptance criteria provides documented evidence of a device's operation within expectation of intended use. Such compliance is required by law and is listed in the Code of Federal Regulations under headings Part 210, 211, 820, 58, and 21-Part 11 as well as other such regulations and guidance as applies.

Forms may be used as built-in records to store data as it occurs, lending to use of the forms for tracking/audit trails. The forms are further useable as a basis for generating reports in a variety of formats. However, as reports are changed, the underlying processes (e.g., the forms containing the data from which the reports are generated) stay the same. Basic universal forms stay the same, while the data they contain can be used to report in many different ways. The forms may be provided to a user in a "wizard-type" environment (i.e., as a "wizard-type" interface), wherein the user is prompted for simple tasks, the response to which are incorporated into a much larger data product. In this way the user only has to deal with simple, single item tasks, one-at-a time.

An enterprise content manager (ECM) may be employed to provide a secure platform to manage all data storage, metadata extraction and archival of data. One non-limiting example of an ECM that may be employed is a Cerity ECM, available from Agilent Technologies Inc. Since an ECM is an enterprise system, it also provides scalability to the present system.

Figure 1:
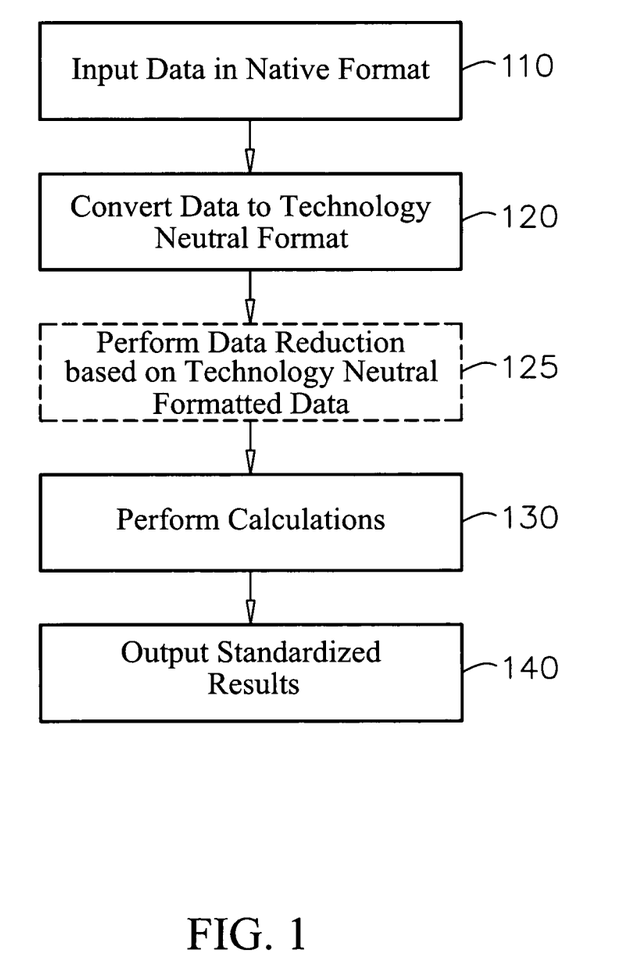
FIG. 1 shows a flowchart of events that may be carried out during processing according to at least one embodiment of the present invention.

Referring to FIG. 1, data is inputted to the system in its native format at event 110, for initial conversion to a technology neutral format (event 120) so that all further processing is with respect to data that is all in the same format, regardless of which instrument was used to originally output the data in its native format. Data reduction may be performed at event 125 by a data reduction engine as described below, if needed. By performing calculations/further processing (event 130) on technology neutral formatted data with the present system, calculations are thereby standardized, so that results (event 140) are directly comparable between data produced by various instruments, models and manufacturers. The standardization is made possible by the system's ability to convert data from external sources into a technology neutral format which is then data reduced and calculated by common components. Further, this standardization may be applied to data sources manually, semi-automatically (requiring some manual application) or automatically, and such data may require data reduction, or may be in a ready to process form. In this way data that characterizes the operation of instrumentation or controlling data systems can be used for the purposes of qualification of said device irrespective of proprietary or native format. One non-limiting example of a technology neutral format that may be employed by the present system is referred to as Analytical Information Markup Language which is an open source, XML-based standard for formatting analytical data. By converting all data to a technology neutral format, and then processing the converted data all according to the same protocols, results are generated that are standardized and directly comparable among results for different instruments which may be different models and/or made by different manufacturers.

As noted, the computerized data system (CDS) that is in place for operating the instrument(s) to obtain the data on which a report is to be generated may be used as direct input to the system. Thus, original data collected for a report may be accomplished using the native controlling software (of the CDS) of the instrument(s) without the need to go through external analog to digital conversion or other manipulation. Original data, which may be preserved for possible reanalysis by the native CDS, is also converted to an accepted technology-neutral format allowing the data to be submitted to a single reprocess and calculation engine for consistent reduction and processing. By using the native CDS, the present system may also make use of the drivers employed by the native CDS, thereby further facilitating the universal applicability of the present system to different types of instruments and to instruments having different standards/CDS's as a result of being produced by different manufacturers.

Figure 2:
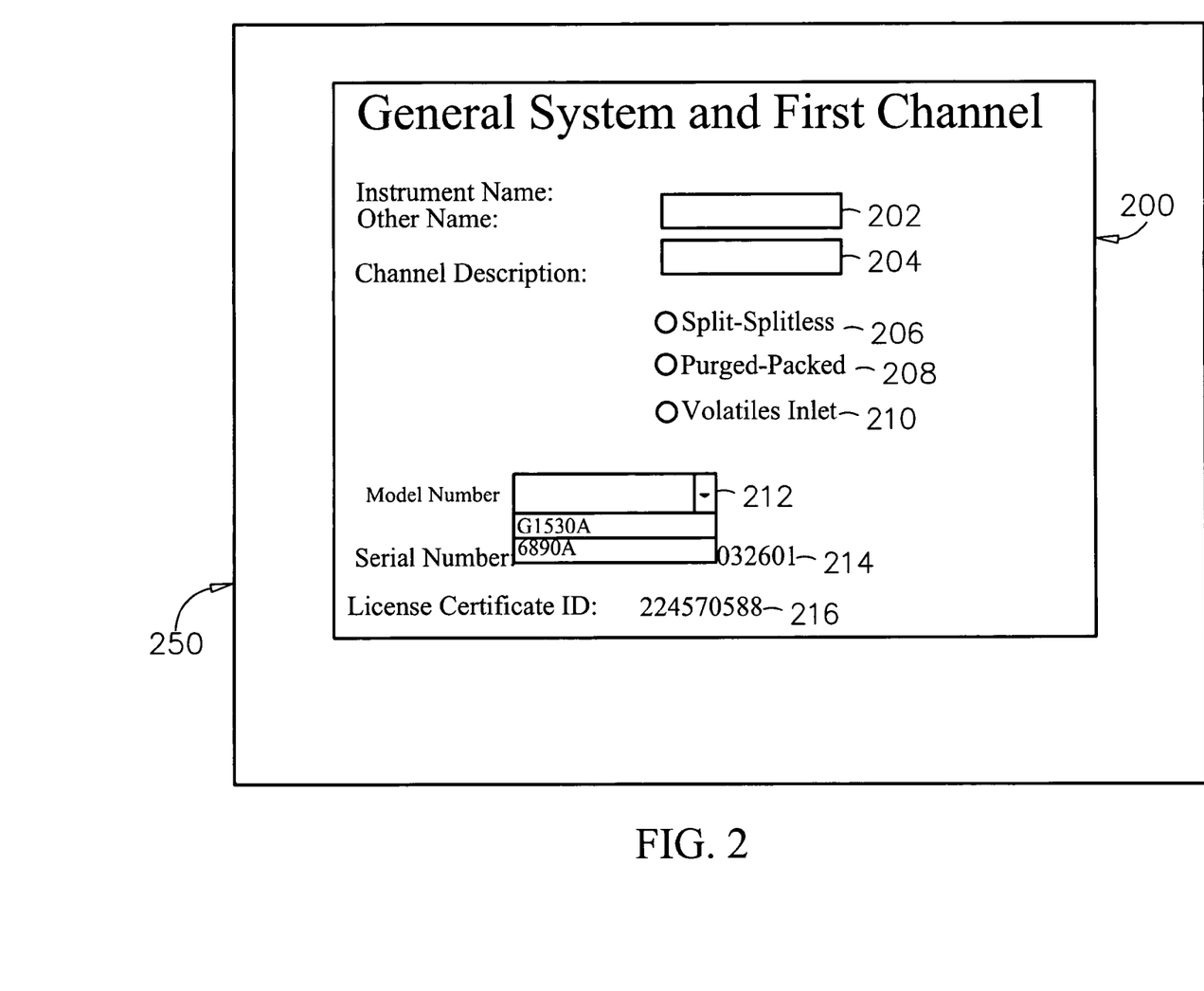
FIG. 2 illustrates one example of a form that may be used by an embodiment of the present invention.

Instructions may be instantiated as forms 200 (e.g., see FIG. 2) to provide procedural information, while also functioning as data repositories. Forms 200 may be constructed in many different ways and presented to have as many different appearances, some of which are dictated by the information to be displayed/stored and much of which may be flexibly designed. The instrument/process type as well as the required input to the form 200 dictates the content and appearance of form 200. FIG. 2 shows one example of a form 200 which is in no way meant to be limiting, as many different forms may be provided by the system. In FIG. 2, form 200 includes fields instructing the following data to be inserted and stored: Instrument Name 202; Other Name 204; Channel Description: Split-Splitless 206, Purged-Packed 208, Volatiles Inlet 210; Model Number 212; Serial Number 214; and License Certificate ID 216. Forms 200 may be run as an applications program interface (API) and, as such need not ever be even visualized by a user of the system when all data fields can be automatically identified from the technology neutral formatted data and/or native CDS and populated into form 200 to complete all data fields.

Alternatively, or additionally, a user interface 250 may be provided to display one or more forms. In a case where automatic population of all required data is not possible, user interface 250 can display form 200 so that a user can interactively select an entry (as in the case of Model Number 212, shown in FIG. 2, where a drop down menu is provided from which the user can selected the proper entry) or manually input an entry, such as by typing, cutting and pasting, scanning or some other alternative data entry mechanism that requires intervention on the part of the user. Further alternatively, the user interface 250 may be optionally used to enter all data required by a form, either as a result of user preference to do so, or because an instrument being considered is sufficiently old or unsophisticated, so as to lack a sophisticated enough software interface to supply some or all of the data automatically by interfacing with the present system.

As another alternative, a user interface may display a test protocol that prompts the user to input information regarding results of a test. In some instances, the test may be automated, wherein the system may prompt one or more lab instruments to initiate a test protocol in response to one or more answers inputted into the user interface by the user in response to questions asked on an interactive form/test protocol, or in response to results from another instrument (e.g., in response to a test protocol designed for that instrument).

The system may also provide a report detailing processes and/or instruments that do not comply with selected specification (i.e., a protocol deviation form).

The forms may be XML based forms that can be directly rendered to a final report (such as in pdf format, or other formal suitable for paper documents, for example). Thus, for example, forms 200 may be displayed in pdf or some other document format on user interface 250 when part or all of them are to be interactively filled out by a user. As noted, part or all of forms 200 may be programmatically filled out from auto detection of calculation engines provided by the system. Forms 200 may be left in native XML format and thereby function as storage for the data that they contain. Forms 200 may be further rendered from the XML format to an HTML version for use with a browser.

When used interactively, forms may be presented to a user according to need and thus, forms that apply only to the instrument(s) under test are presented, thereby reducing delivery complexity and error potential, while at the same time providing audit trails for tracking, since the forms may be saved, as noted above. By converting proprietary data into standardized data (i.e., data having a technology neutral format), the system may provide data in a standardized output form. Thus, inconsistent output from instruments can be converted to consistent input to an engine that can do calculations in a very predictable, standardized way, which is an important consideration for qualification and compliance reports.

Figure 3:
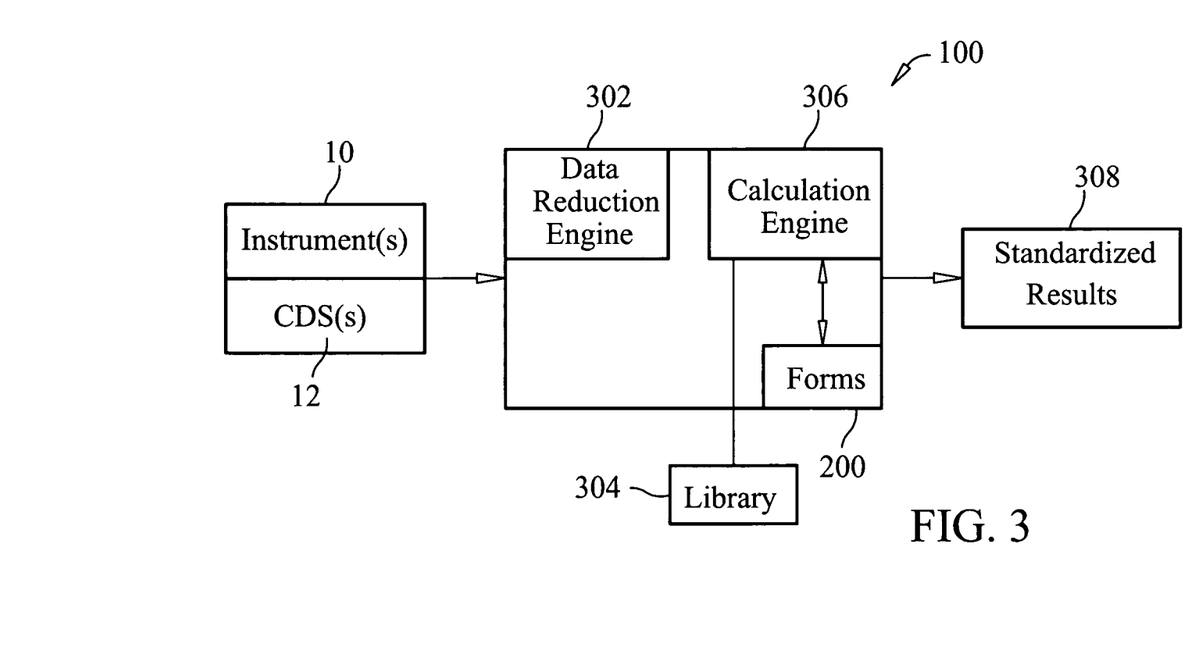
FIG. 3 is a schematic flow chart illustrating process flow according to an embodiment of the present invention.

Once native data has been converted into technology neutrally formatted data, metadata may be created by data reduction engine 302 of the system 100 so that algorithms from the instrument's 10 system(s) do not need to be relied upon, and this further ensures standardization of results. For example, for application to chromatography, the present system does not rely upon the software 12 running the chromatography instrument 10 from which the raw data is generated to determine what is a peak in the data or where to define the location of that peak, as such determinations are made based upon calculations and algorithms run by the data reduction engine 302 of the present system. Data reduction engine 302 reads the data having been converted into technology neutrally formatted data and converts this digital representation of an analog function into data representing features described/characterized by the data (e.g., peaks, noise, gradient steps, etc.). The same applies to other calculations, such as those determining and or filtering noise levels, etc. Using this approach, consistent results are determined for data across the board, whether a particular type of instrument 10 was manufactured by one or another particular manufacturer, or whether the instrument 10 is a different model than another, both of which data is being processed from.

Figure 6:
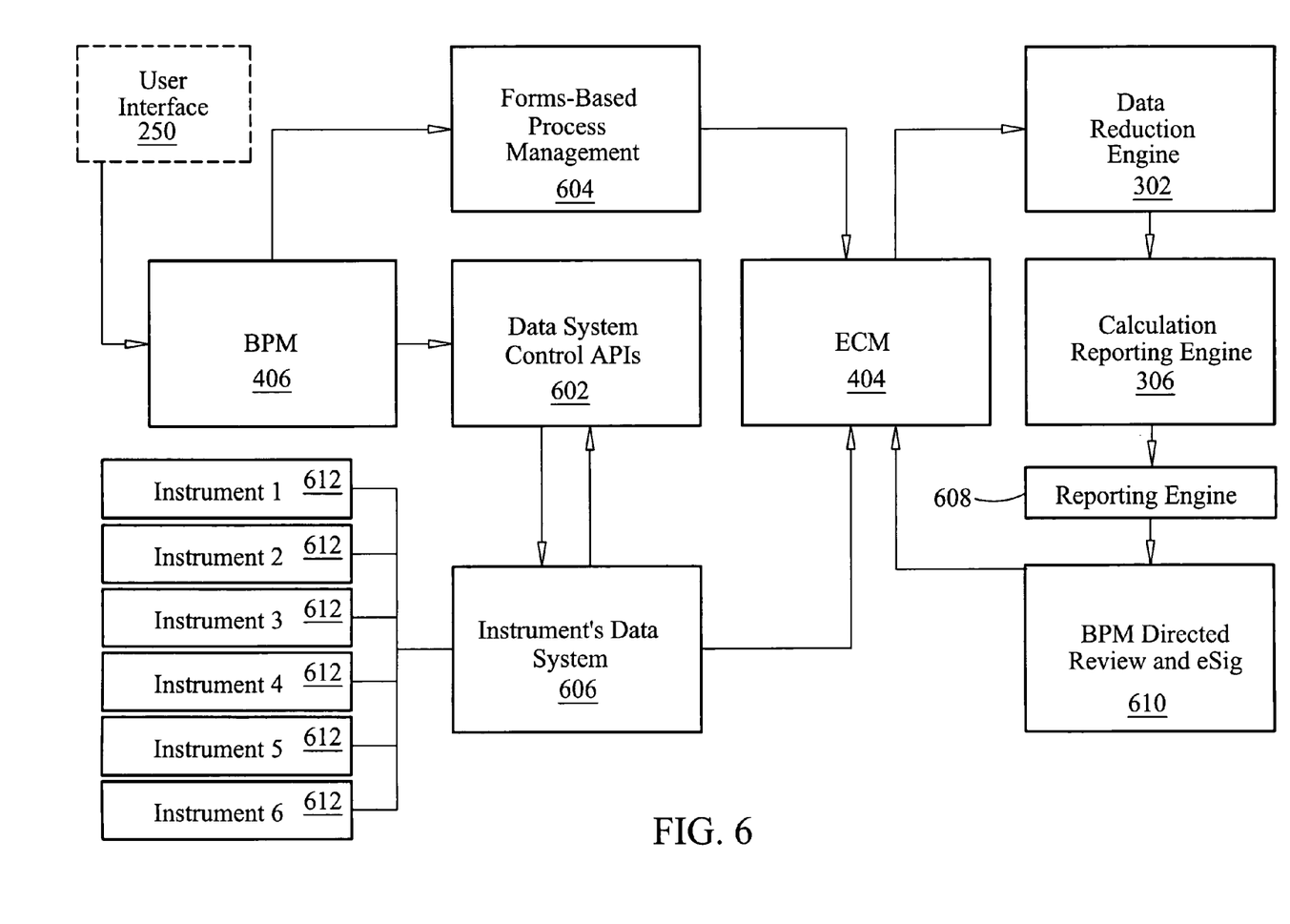
FIG. 6 is a flow chart illustrating further details of process flow by an embodiment of the present invention.

As one example, signal data from a chromatography instrument 612, as inputted to system 100 by the native controlling software for the instrument is just a series of changing signals over time. Reduction engine 302 converts these signals (having been converted to a technology neutral format) into useable data, e.g., peak area, noise calculations, etc.—which can be fed to calculation engine 306—e.g., there are 5 peaks and those 5 peaks have peak areas of 2, 2.1, 1.9, 2 and 2 and the mean is X, with standard deviation of Y, etc. so that these values can be compared to an acceptance standard, or with like values calculated with regard to another instrument 612.

Depending upon the instrument that has generated the data, a data reduction engine 302 may not even be needed. For example, a balance already outputs data that is reduced to numbers that are useable by calculation engine 306 and so this data doe not need to be further reduced, although it may need to be converted to a technology neutral format. Further, other alternative reduction engines 302 may be included with the system 100 as part of a library that may be accessed for non-standard reduction requirements. By performing data reduction with a component of system 100, this separates reliability on each instrument's software for performing such functions. Accordingly, all data reduction is standardized across reports that are prepared by system 100, and performance is all standardized by evaluation by the same system.

Further, since the data is standardized, only one method need be developed to produce a particular type of report based on the data, as opposed to the current need to create a method for each instrument that employs a different data type or format. Thus, calculation engine 306 can perform calculations based upon a single library 304 (e.g., series of calculations tailored to a specific type of report for a particular type of data reporting). That is, since consistent raw data sets (i.e., technology neutrally formatted data) are received by data reduction engine 302, these data set can be properly manipulated with a single consistent method. Thus although the method for acquisition of data may vary depending upon the computer data system from which the data is being acquired, once that data has been converted to a technology neutral format, the back end processing is consistent (e.g., processing by data reduction and calculation engines, etc.). Library 304 typically contains a set of calculations for performance of the standardized tasks in the back end processing (e.g., calculation/identification of peaks; calculation of statistics describing the data, etc.). With respect to data reduction and calculation, the results may be standardized and independent of the originating data-system or controlled instrument, as noted above. Reports based on those results are fully customizable, as reports ranging from simple summary reports to traditional, fully described compliance protocols may be outputted.

The library can be modified, typically added to, to increase functionality, but it does not have to be a different library based on the data system that the instrument used, contrary to what is currently required. Consequently, calls become consistent and calculations become reusable and portable. For example, a library may be created to calculate peak precision, signal-to-noise, etc., and library 304 may be built to accept only consistent input forms because the input format will always be the same, since the engine for extracting data (data reduction engine 302) will always be the same. Running processes in this way provides consistent metrics across all manufacturers, types and models of instrumentation. For example, peak detection and baseline evaluation can be performed as de facto standards against which all systems/instruments may be evaluated. Thus, such a library 304 is reusable and portable, being applicable to calculation of the defined data specifications based upon data inputted from the data reduction engine 302, and wherein data reduction engine 302 may be applied to data from any applicable instrument for which it makes sense to calculate the prescribed specifications, since the data from the instrument will have been converted to a technology neutral format that the data reduction engine 302 is configured to receive as input.

The standardization of processing will advantageously reduce training requirements for operating personnel, since personnel will no longer need to be trained for operating with regard to each different piece of equipment, but can instead be trained to run the standardized processes. For example, under conditions prior to the present invention, it would not be unusual for an instrument (piece of hardware) 10 to be operating in various locations under multiple (e.g., three) different proprietary operating software platforms. For compliance purposes, it might then be necessary to replicate the compliance procedures as many times as there are multiple platforms. By providing the present system as built on an independent platform, it is not dependent upon the operating software of the particular instrument upon which reports are to be generated. In this way the system is readily adaptable to new/various hardwares as well as softwares, given the generic nature of the protocols.

As noted, system 100 may further employ a calculation engine 306 to perform calculations on the reduced metadata set produced by data reduction engine 302 for formulating standardized results 308. Calculation engine 306 performs calculations on metadata in the reduced metadata set received from data reduction engine 302 as well as any calculations that may need to be performed on other data that has been converted to the technology-neutral format, as instructed by forms 200, such as for the performance of qualification services on analytical instruments as well as other instruments. As noted, forms 200 may act as instructions for processes earned out by calculation engine, as well as for data storage repositories of the results of these calculations. Forms 200 can contain any combination of input types including interactive manual input, information detected by software of system 100 and/or the CDS of the instrument being considered and/or calculated reduced data. Forms 200 may further include launch points for executables that perform detection, calculation, or any other function called for by the process. Forms 200 may be version controlled and stored as record of the data collection process leading to a resulting final report. In this way the stored versions of forms can serve as an audit trail from the time of initial collection of the data all the way through to the time of the issuance of the final report.

Because of the standardization of all data to a technology neutral format and creation of metadata from the same, calculations by calculation engine may be carried out by calls to a consistent and tested library, as the calculation are reusable and portable.

Figure 4:
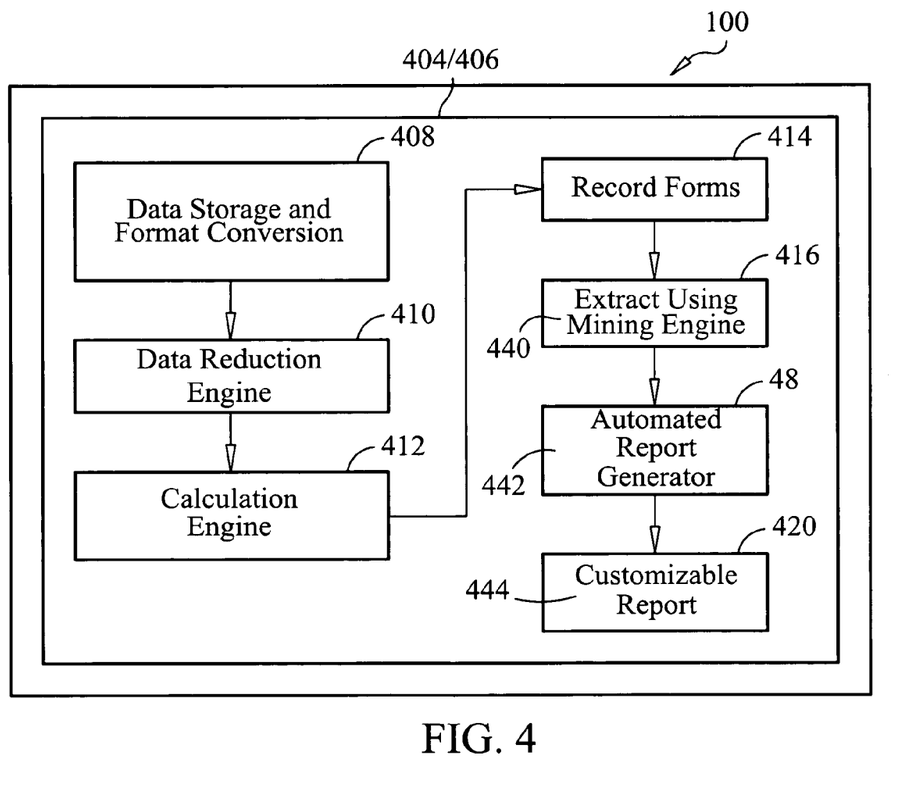
FIG. 4 is a block diagram illustrating functions and processes that may be managed through a business process manager according to an embodiment of the present invention.

In order to manage data storage, metadata extraction and archival of data, as well as compilation of final reports and other form management functions, system 100 may employ an enterprise content manager (ECM) 404, as noted earlier. ECM 404 may provide a secure platform on which to manage the functions described. FIG. 4 illustrates a flowchart of functions and processes that may be managed by ECM 404 via business process manager (BPM) 406. BPM 406 manages flow so that data storage and format conversion (to a technology neutral format) are carried out by ECM 404 at event 408, followed by reprocessing/data reduction by data reduction engine at event 410, functions of which were described above. Further calculations are carried out by calculation engine 306 at event 412, which may be based upon instructions contained in forms 200 and the data populated into forms 200 may be recorded and stored in ECM 404 at event 414. The record forms 200 may then be data mined at event 416 by record mining engine 440 to extract specific items of data/metadata that are required to populate a final report.

FIG. 5 illustrates data extraction from a form 200 to obtain information needed for preparing a report, wherein a portion of a record form 200 is shown from which a particular data entry 502 is located. Record mining engine 440 may employ toolsets for mining data, e.g., name-value pairs may be taken from forms 200 and calculation engine 306 may further extract those values needed by identifying such values based upon the names associated with the values in the name-value pairs. Data from a form 200 can be calculated and the resulting calculations may be returned to the same form 200 or to another form 200 as needed for purposes of organization, readability, clarity, etc.

As shown, forms 200 actually do contain the information/data received from the software of the instrument being considered, and that data can be mined to fill out automated report applications or otherwise to fill out a final report 444. In this way, forms 200 act as a repository that can be mined in various ways—compliance, asset management, etc. Once a final report 444 is signed, however, the data that was mined to fill out the final report document 444 can no longer be changed, ensuring inviolable metadata, so that an effective audit trail is maintained.

An automated report application (automated report generator) 442 may be optionally included, and if used, functions to automatically populate documents at event 418 which are then outputted as a customizable report 444 at event 420. Automated report generator 442 is an application that facilitates that construction of configuration-specific documents from a library of all possible configurations. Automated report generator 442 allows documents to be populated with content learned through many various mechanisms, such as the mechanism that have populated forms 200. An analogy to one function of the automate report application 442 is with reference to an automobile and an automobile user's manual that accompanies the automobile. Because the owner will typically have many options from which to choose from, the owner's manual is typically written to describe each of these options. Thus, for example, if an owner has a particular type of sound system, but there are six different sound system options for the owner's car, in order to access information about the sound system, the owner will typically have to page through descriptions of all six sound systems options in the user's manual until the matching sound system is found. An automated report application for owner's manuals would prepare this user's manual based upon the options chosen by the owner, so that when the owner looked up the description of the sound system, only one sound system would be described in the owner's manual, i.e., the description for the sound system actually selected by the owner for his/her car.

The automatically populated forms 200 as well as the final report 444 may be stored into ECM 404 so that ECM 404 is the location of the initial collection, calculation, meta-data and final data, as well as audit trails. Thus, system 100 may include a relational database with tools such as data reduction engine 302, calculation engine 306, and record mining engine 440, for example, sitting on top of it.

Reports 444 can take on any form, and may be selected by a user. For example, a report may be created in summary form or in full detail, with or without a logo, etc. While the reports 444 are customizable, the underlying forms 200 created by the system 100 do not change so that standardization is preserved. Auto-documentation feature 442 may be optionally provided, as noted above, whereby the user is provided with selectable choices, via user interface 250, to determine the format of the report 444 to be produced. Thus, depending upon the selection made, different groupings of metadata from the underlying forms 200 are selected and combined into a format of the final form selected.

Audit trails may be automatically provided by the metadata stored as forms 200 by ECM 404, as alluded to above. Further BPM 406 may provide e-mail notification, scheduling and review, electronic signature functions, etc.

Referring now to FIG. 6, a flow chart that further explains process flow by the system is shown. As noted above, a user interface may or may not be needed, which may depend upon the choice of the user, the types of instruments being reported upon, and/or whether the system is capable of fully automatically obtaining all information required to generate a final report. System control API's 602 are provided for running processes so that there is not a need to display the process on user interface 250. The business process manager (BPM) permits flexible formatting of process. For example, the process can be changed just by changing/rearranging a flow chart similar to that which is shown in FIG. 6. For example, flow charts used may be flow charts produced by Microsoft Visio or other alternative chart building software that allows flow charts to be readily modified interactively. Such chart building softwares provide a visual manifestation of a process implemented and controlled by BPM 406. As a simple example, if a current process flow of system 100 includes a process or subprocess defined by steps A>>B>>C>>, but the current user/client requires step B to be performed after step A and before step C, then the current process chart can be interactively rearranged, such as by dragging step C between steps A and B and dropping it there to result in a process/subprocess defined by the steps A>>C>>B. Accordingly, the system 100 provides a great amount of flexibility for customizing the process control, which is then managed by BPM 406 using forms-based process management 604 as was described earlier.

The technology neutral design of system 100 allows any client's or manufacturer's data system (i.e., Instrument's Data System 606) to be fed into ECM 404. Accordingly, any type of instrument, model of instrument or manufacturer of an instrument may be included as instruments 612 from which data can be received by system 100. For example, Instrument 1 may be a liquid chromatography/gas chromatography instrument 612 produced by a first manufacturer, Instrument 2 may be a liquid chromatography/gas chromatography instrument 612 produced by a second manufacturer, Instrument 3 may be still another liquid chromatography/gas chromatography instrument 612 produced by a third manufacturer, Instrument 4 may be a mixed vendor system, Instrument 5 may be a refrigerator with an embedded microprocessor or other associated hardware/software configured to input data to system 100 (or alternatively, data from this instrument may be manually inputted via interface 250 if Instrument 5 is not sufficiently automated), and Instrument 6 may be a centrifuge, wherein the same considerations apply as described with regard to Instrument 5. A "mixed vendor system" refers to systems produced by more that one manufacturer/vendor. Examples of mixed vendor systems include, but are not limited to: a computer data system manufactured by a first vendor and controlling an instrument manufactured by a second vendor; a computer data system produced by a first vendor that controls instruments produced by second, third and fourth different vendors; or a computer data system produced by a first vendor and controlling a single instrument made up of components produced by different vendors, etc. As long as the associated computer data system can successfully drive the mixed vendor system, the present system can process the data in a manner as described.

As noted above, if the instrument's data is proprietary data, the proprietary data is converted to technology neutral formatted data, (e.g., AnIML) using data system control API's 602 (or, if provided in human readable form, the data may be added to the forms manually and included into qualification processing with any required calculations) and both the proprietary data and the converted, technology neutral data may be saved in ECM 404.

The technology neutral formatted data can then be further processed by data reduction engine 302, calculation engine 306 and reporting engine 60S. Reporting engine 608 requires at least one of a data mining application (e.g., record mining engine 440) or a middleware component configured to provide an input file to reporting engine 608 to correctly populate a report.

Once final report 444 has been generated, BPM 406 can direct reviews and signatures electronically at event 610. The final report, both signed and unsigned may be stored in ECM 404. Further, all intermediate forms 200 and the data that they store may be stored in ECM 404 to maintain a complete audit trail, as was also discussed. All processing represented in FIG. 6 may be based on forms and the instructions contained therein. WYSIWYG authoring capability may be provided by the forms designer application for designing forms 200. Secure data handling is ensured by ECM 404. Standardized results are the end product of these methods, providing a clear differentiator over anything that is currently available in the market.

The data path that the instrument 612 uses is the same data path that system 100 uses for reports such as compliance. However, the calculations performed on the data for whatever report is to be produced, do not need to be performed on the instrument itself, nor does the instrument's software need to be employed for performing calculations. Advantageously system 100 provides everything that is needed for performing such calculations. This effectively reduces the native computer data system (CDS) to a controller and data acquirer. Such reduction provides checks on the interplay between the hardware and software of a system to be qualified at each qualification event without burdening the hardware qualification event with data reduction evaluation of the native CDS. This assures that the more frequent requirements for hardware qualification provide the maximum value with respect to CDS verification, without forcing extensive CDS evaluation. Further, the controlling system (CDS) need not be qualified for use in the qualifying of hardware, since it is not used for such purpose by system 100. Rather, system 100 performs calculations on the raw data produced by the instrument (after conversion to a technology neutral format, if necessary), thereby taking the instrument's controlling software out of the loop and effectively separating the instrument's hardware, from the associated software, so that the report can focus on the hardware, independent of qualify the instrument's controlling software.

The modularity provided by system 100 facilitates modular instrument qualification after repair. The process flow manager 406 may present forms specific to the tests associated with the requalideation of a module. The resultant data can be associated with the module, stack and existing compliance documentation to requalify the module. Thus, if a module needs to be repaired, then that module can be requalified, rather than having to requalify the entire system, i.e., qualification may be done on a modular basis.

BPM 406 may control the workflow from collection of data through approvals/signatures of final report 444, and may be tightly integrated into ECM 404. The entirety of processing may be web browser-based or terminal servers-based so that no footprint is imposed upon the user's qualified computer. In instances where ECM 404 has been incorporated into a customer's system, local interfaces (e.g., user interface 250) may be employed.

Figure 7:
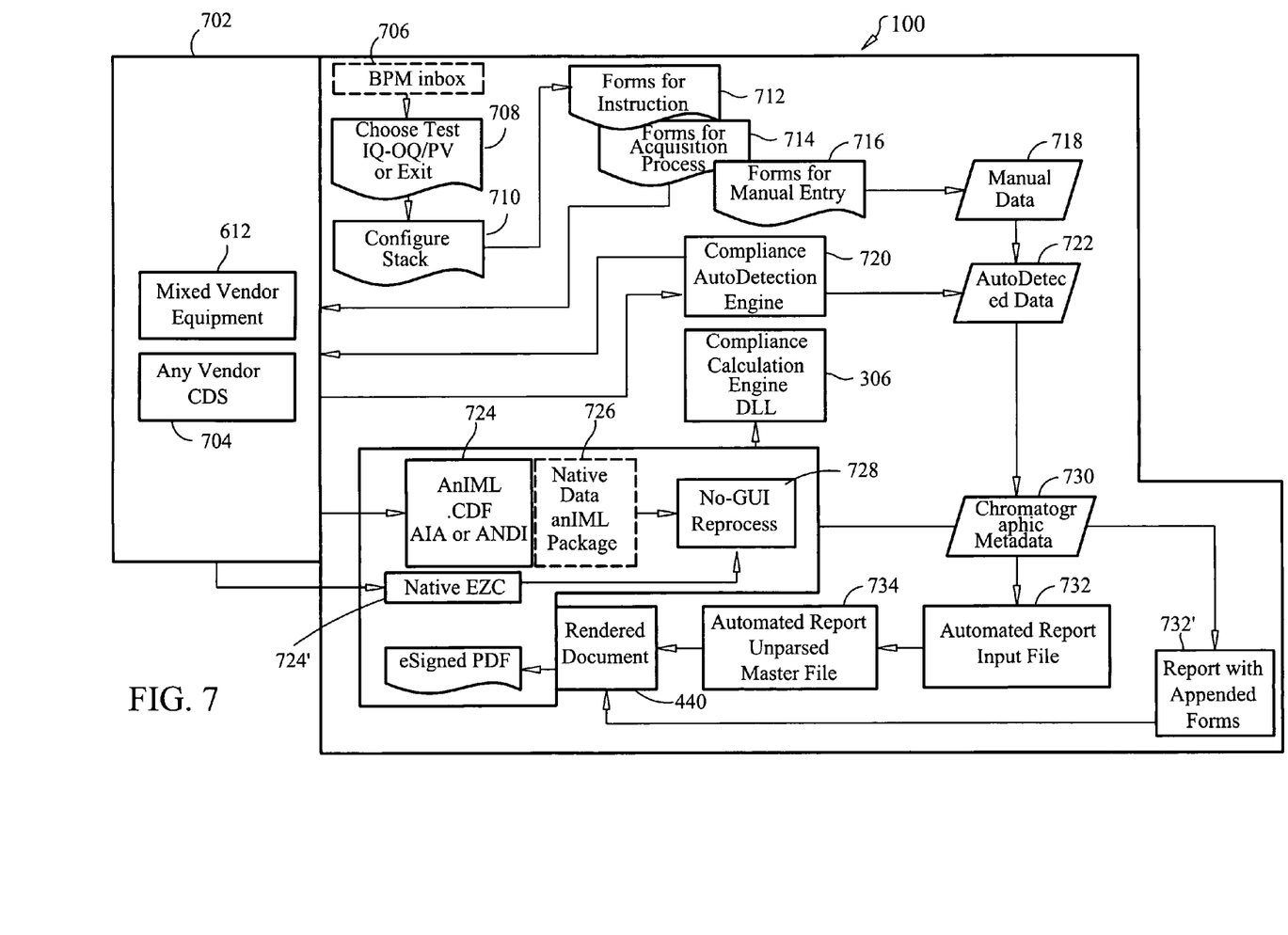
FIG. 7 is a schematic representation of an embodiment of a system for use in creating a compliance report for chromatographic instrumentation.

Referring now to FIG. 7, a more specific schematic representation of system 100 is shown for use in creating a compliance report for chromatographic instrumentation. System 100 is represented as interfacing 702 with native CDS to receive data inputs. In this example, the equipment being reported on is mixed vendor equipment 612, in which case, any or all of the vendor's computer data systems 704 may be employed through which data is inputted to system 100. Typically, however, a common data system controller (CDS) is provided to control all of the mixed vendor modules, as noted above. Forms 200 that are driven by BPM 406 may be presented to a user by placement into a user-specific inbox (i.e., BPM Inbox 706), that functions similarly to the inbox of an e-mail service. In this way, simple instructions can be provided in a "wizard" like environment (i.e., where simple tasks are completed sequentially and interactively). Thus, if a message is placed in inbox 706 that instructs a simple task to be performed, once the task is performed or "Done", then the next task can be emailed or placed into inbox 706. At event 708, a user, or manager assigning tasks to a user, may choose the type of test or qualification to be performed. In response to this choice BPM 406 may then run a template to call the correct forms to be completed for the chosen test. Configure stack 710 provides a configuration-specific template which determines the required tests, forms and instructions to be processed. Forms for Instruction 712 are one option for processing, herein these forms 200 associated with a qualification event may contain simple instructions for processing with no data entry potential. Forms for Acquisition Process 714 provide another option for processing according to forms associated with a qualification event in which forms 200 may describe the setup of the native data system to perform specific runs and acquire specific data from the instrument and/or software to be qualified. Those same forms 200 may provide controls for entry (which may be manual and/or automated) of the results obtained from the processes run with respect to the native computer data system to obtain the specific data. Forms for Manual Entry 716 are forms 200 in which manual entry may be made directly to. Alternatively, entry may be made to these forms 200 via an application supplied user interface when required by a system being tested. Manual data 718 refers to a further embodiment of forms 200 that may be created such that form elements are present to allow manual, interactive entry of data from an attendant user. Forms 100 may also be constructed as a mixed model where some elements of the forms 200 are automatically filled in when the data is available to the system. When data is not available to the system for automatically filling in the forms 200, such data can be interactively filled in (manually) by a user.

Compliance auto detection engine 720 may be an applet very similar to calculation engine 306 that stores or accesses identifying characteristics regarding various types, manufacturers, etc. of equipment. So for example, where a form requests a model number and serial number of an instrument 612, rather than requiring a user to manually enter this information, autodetection engine 720 queries the software 704 associated with the piece of equipment 612 to obtain the required information and then automatically enters it into the form 200 from which the request originated. If autodetection engine 720 is unsuccessful in automatically retrieving some of all of the information that was queried for, system 100 leaves the entries for this information on the applicable forms 200 blank and presents the forms for manual completion in addition to the automatic generation (autodetected data 722) to whatever extent was possible.

Data storage and format conversion of the inputted data are performed by ECM 404 as controlled by BPM 406 in accordance with the instructions contained in forms 200 selected by BPM 406 for processing the data, wherein forms 200 identify the particular data that is needed. In this example, data is converted to AnIML formatting 724 or other common data form (CDF), such as AIA (Analytical Instrument Association) or ANDI (Analytical Data Interchange) format (typically annotated with .cdf extensions), using Native Data AnML package 726.

Once converted to technology neutral format, data reduction engine 302, which is also tightly integrated to ECM 404 may perform reprocessing of the data in accordance with the needs of the final report to be generated, as instructed by the forms 200 that need to be filled out and as guided by BPM 406. Reprocessing/data reduction calculations can be can be driven by API, so that no user interface is required (i.e., No-GUI Reprocess 728). Thus, data can be inputted directly from an instrument's operating software 704 to instrument 100 where it may be converted to a technology-neutral format and then fed directly to data reduction engine 302.

The reduced/reprocessed data is forwarded to calculation engine 306 (in this example, calculations are performed for a compliance report, and engine 306 is referred to as a compliance engine) for further calculations that are instructed by forms 200. Calculation engine 306 may mine forms 200 that have been populated by the reprocessing by data reduction engine 302, or may obtain data from mining results based on matching names to name-value pairs as described above, perform the instructed calculations, and, together with the reprocessed data, output metadata 730, which is chromatographic metadata in this example. This processing may also be API driven, so that all processing may be carried out in the background, without interrupting a user for interactive input.

However, even if all the automation cannot work as intended, (such as when an instrument lacks adequate software or other capability for automatically interacting with system 100, for example) then system 100 may launch user interface 250 to accept some interactive input from a user, under guidance of a standard operating procedure, so that the user can interactively choose information to be filled in. Even the calculation engine 306 is designed to work as an API, as noted. However, a user interface 250 may also be provided for calculation engine 306 to allow a user to use it as a custom calculator, for example, so that the same results can be manually calculated, through interface with a user, since the custom calculator uses the same engine 306 that the automated client uses.

Any or all of the manual data 718, autodetected data 722 and metadata 730 may require some additional manual entry(ies) depending upon the particular instrument from which data is being obtained. Examples of metadata entries that may need to be entered manually include, but are not limited to results of data collected from a source other than the data source provided by the native CDS, such as readings from onboard sensors, readings from external measurement devices, etc. Forms 200 that contain the manual data 718, autodetected data 722 and metadata 730 are mined for the specific data required by the final report 444 to be created (such as by using record mining engine 440), and the mined data may be forwarded to an automated report generator application 442 that assembles the mined data into an automated report input file 732 which is forwarded to an unparsed master file 734, from which the automated report application renders the final document 440.

Alternatively, an automated report application need not be implemented. For example, final reports may be embodied by completed forms 200 without the need to data mine such forms. Further alternatively, a final report may be compiled by mined data that is simply assembled and attached to the forms 200 containing metadata. Everything between the raw data (e.g., original data received from an instrument or instrumentation software) and the final reported values is considered metadata. Metadata may be raw data or mined data or a combination thereof as it is used to populate a form. Some pre-final data may already be provided on a form while additional pre-final data may need to be added by the process. The data on the forms 200 can all be considered metadata in the sense that it is used to create the final report data so it qualifies as data about the final report data.

BPM 406 may then forward the final document, such as via e-mail, for example, to have the final document (which may be in pdf format, as in the example shown in FIG. 7) signed. The final report cannot be modified by those reviewing it, but must be reprocessed by the system 100 if changes are to be made. The process flow for such a rerun or re-evaluation involves returning the process to the step that begins processing the information that is desired to be re-evaluated. However, if this is not done, then any changes will still be captured by ECM 404 through its automatic audit trails functionality. Further, BPM 406, together with ECM 404 may track the review process and store records of the same to maintain the chain of the audit trail. The final report 440 is thus a defensible piece for use in meeting compliance regulations.

Forms 200 provide the basis for processing data by system 100. Wizard-like central data collection may be provided wherein either the automated client or a user are provided with simple tasks to complete by filling in the appropriate data, which may require a user to type in, scan in, select, or otherwise enter data, or which may require the automated client to query the instrument's software for the data which is then inputted to the form, or to perform calculations on select technology neutral data having been converted from the native data received from the software of the instrument, or other processing as instructed by the particular task presented by the form. In their most basic configuration, forms 200 are provided to generate a customer deliverable, typically a final report containing specifically requested or required data. Thus, forms 200 with standard defaults may be provided to automatically generate such a final report.

Further, forms 200 stored in ECM 404 may be configured to function to provide an audit trail (such as by storing versions of the forms as they are completed, together with data and time stamp, for example). Further, forms 200 may be configured to contain instructions for all processing by system 100. For example, certain forms 200 may contain specific instructions for calculations to be performed by calculation engine 306. Thus, forms 200 can be interactively filled out by a user through user interface 250, and/or can be programinatically filled out by autodetection processes or calculation engines.

Various combinations of forms 200, automation and custom reporting may constitute a final report by system 100. For example, forms 200 alone may be interactively filled out by a user to prepare a final report. Using ECM 404 together with forms 200, forms 200 along with the final report 444 may be centrally stored and provide an audit trail for support of the final product. By adding the automated calculation engines, such as data reduction engine 302, calculation engine 306 and records mining engine 440, for example, processing may be fully automated to provide a final report, if only according to a defaulted form of the final report 444. Adding the autodoumentation application 442 provides further flexibility, whereby a final report 444 can be customized. Note also, that the modules need not be combined as described, or in the order as described. For example, forms 200 may be combined only with automated report application 442, so that a final report 444 generated from manual inputs to forms 200 may be customized using the automated report application 442.

Further, a hierarchy of forms 200 may be provided for more efficient completion of forms 200 during processing. For example, a master form may be set up to feed other process forms. A master form generally contains information that is globally the same with respect to all process forms that it feeds. Accordingly, this permits that global information to be filled out only once, after which is automatically appears in all of the subordinate forms 200 fed by that master form 200. Different types of master forms 200 may also be created. For example, a qualification master form 200 may contain global information such as customer information (address, names, etc.), instruments that a qualification will be covering, and/or acceptance limits for instrument categories. An instrument configuration master form 200 may contain a named configuration mapped t configuration details (e.g., a stack of instruments 612) and/or override limits for specific equipment needs. A stack, for example, may include all of one type of instrument, different vendors' instruments, or any combination of instruments, as the complexity of the stack can be programmed into an instrument configuration master form 200. Instrument configuration master forms 200 may be limited to only those instruments and vendors that are configuration master approved, to prevent a user from arbitrarily attempting to add an instrument to ah instrument configuration master form for which there is no procedure for processing.

Using the methods and systems described herein, non-vendor specific instrument qualifications may be processed using a native controlling software of an instrument combined with a technology-neutral, standardized, post-collection data reduction and reporting model. Such processes may be provided by universally applicable, scalable, automated, secure and consistent platform for the development, and delivery of instrument qualification. Original data collected for the qualification may be accomplished using the native controlling software without the need to go through external analog to digital conversion or other manipulation. However, the system 100 is not precluded from using alternative data input methods, including, but not limited to data that has already been digitized; manual input of data, etc. Original data may be preserved for possible reanalysis by the native controlling software, and may also be converted to an accepted technology-neutral format allowing the data to be submitted to a single reprocess and calculation engine for consistent reduction and processing. Instructions may be instantiated as forms, which may provide procedural information as well as act as data repositories. Forms may be presented according to need and apply only to the instrument under test to reduce delivery complexity and error while providing audit trails for tracking.

While the present invention has been described with reference to the specific embodiments thereof, it should be understood by those skilled in the art that various changes may be made and equivalents may be substituted without departing from the true spirit and scope of the invention. In addition, many modifications maybe made to adapt a particular hardware, software, instrument, module, process, process step or steps, to the objective, spirit and scope of the present invention. All such modifications are intended to be within the scope of the claims appended hereto.

That which is claimed is:

1. A method of compliance testing of an analytical instrument or software, said method comprising:
   performing one or more calculations including data reduction, using a data reduction engine running on a computer, on data outputted from said analytical instrument or software, said analytical instrument or software being characterized by a manufacturer and model;
   producing on said computer one or more outputs in a standard format from results of said performing one or more calculations; and
   selecting from said one or more outputs to populate a final report of data in said standard format; wherein said standard format is a technology-neutral format that is independent of said manufacturer and said model and in which said data in said final report is directly comparable with data in said standard format obtained from processing data from other instruments or software characterized by a manufacturer and model regardless of said manufacturer or model of said other instruments or software, and wherein said performing one or more calculations are performed according to instructions instantiated as forms.

2. The method of claim 1, wherein said forms contain data generated from at least one of interactive manual input, information detected by a system performing said method and software of system, a computerized data system of an instrument from which data is being reduced.

3. The method of claim 1, wherein said forms include launch points for executables that perform functions performed by said method.

4. The method of claim 1, further comprising storing said outputs of performed calculations on the forms.

5. The method of claim 4, wherein said selecting comprises selecting outputs from said forms.

6. The method of claim 4, further comprising storing said forms in a database as a repository of processed data.

7. The method of claim 6, further comprising identifying an audit trail based upon forms and data stored in the database.

8. The method of claim 1, further comprising identifying the hardware from which said data was outputted from, based upon the rules-based algorithm associated with the form.

9. The method of claim 1, wherein said calculations are performed to answer a series of questions relating to one or more performance tests designed to determine compliance of the analytical instrument or software under consideration with a set of predefined criteria.

10. The method of claim 9, wherein the set of predefined criteria comprise criteria defined for regulated industries.

11. The method of claim 10, wherein said predefined criteria comprise regulations set forth in the Food, Drug and Cosmetic Act.

12. The method of claim 1, further comprising automatically storing results of one or more of the calculations on the forms.

13. The method of claim 12, further comprising manually inputting information on the forms.

14. The method of claim 13, wherein said manually inputting is performed interactively through a user interface.

15. A method of compliance testing of an analytical instrument or software, said method comprising:
   performing one or more calculations including data reduction, using a data reduction engine running on a computer, on data outputted from said analytical instrument or software, said analytical instrument or software being characterized by a manufacturer and model;
   producing on said computer one or more outputs in a standard format from results of said performing one or more calculations;
   selecting from said one or more outputs to populate a final report of data in said standard format; wherein said standard format is a technology-neutral format that is independent of said manufacturer and said model and in which said data in said final report is directly comparable with data in said standard format obtained from processing data from other instruments or software characterized by a manufacturer and model regardless of said manufacturer or model of said other instruments or software; and
   converting said data outputted from at least one analytical instrument or software to a technology-neutral format, which is independent of instrument type, instrument model, instrument manufacturer and data type of the analytical instrument or software from which the data was outputted, prior to said performing one or more calculations including data reduction, wherein said performing one or more calculations including data reduction are carried out on said data that had been converted to said technology-neutral format.

16. The method of claim 15, further comprising inputting the data to be converted from a native controlling software of the analytical instrument from which data is to be converted.

17. The method of claim 15, wherein the same data reduction engine is used for data received from multiple analytical instruments.

18. The method of claim 17, further comprising inputting results of said data reduction to a calculation engine and performing at least one further calculation based upon said inputted results.

19. The method of claim 15, wherein said performing one or more calculations comprises creating a technology-independent, reduced metadata set from said data converted to said technology-neutral format.

20. The method of claim 19, further comprising correlating the metadata into a cohesive, audit-ready report that follows best practices for compliance documentation.

21. A method of compliance testing at least one of instrumentation and software, said method comprising the steps of:
displaying a test protocol on a user interface and prompting a user to input information regarding results of a test that has already been completed;
prompting at least one instrument or software associated with an instrument to initiate the test protocol in response to an input by the user into the test protocol displayed on the user interface;
automatically calculating results of the test protocol run on the at least one instrument; and
outputting at least one of said results, wherein the outputs are produced to answer one or more questions relating to one or more performance tests in said test protocol designed to determine compliance of the at least one of instrumentation and software under consideration;
wherein said automatically calculating step comprises:
converting data outputted from the at least one instrument or software associated with an instrument to a technology-neutral format, which is independent of instrument type, instrument model, instrument manufacturer and data type of the analytical instrument or software from which the data was outputted; and
performing one or more calculations on the converted data to produce one or more outputs.

22. The method of claim 21, further comprising selecting from said one or more outputs to populate a final report; wherein the one or more outputs are standardized and are directly comparable to outputs resultant from said method carried out on another set of one or more other instruments and/or software, irrespective of manufacturer or model of the other analytical instruments.

* * * * *

UNITED STATES PATENT AND TRADEMARK OFFICE
CERTIFICATE OF CORRECTION

| | | |
|---|---|---|
| PATENT NO. | : 8,874,400 B2 | Page 1 of 1 |
| APPLICATION NO. | : 12/150030 | |
| DATED | : October 28, 2014 | |
| INVENTOR(S) | : Charles Manfredi et al. | |

It is certified that error appears in the above-identified patent and that said Letters Patent is hereby corrected as shown below:

In the Claims:

In column 17, line 25, in claim 21, delete "software." and insert -- software, --, therefor.

Signed and Sealed this
Seventeenth Day of March, 2015

Michelle K. Lee
*Director of the United States Patent and Trademark Office*